United States Patent
Lee et al.

[11] Patent Number: 5,665,438
[45] Date of Patent: Sep. 9, 1997

[54] ANTENNA ACCESSORY FOR VEHICLE IDENTIFICATION

[76] Inventors: Inita Lee, 135 Westgate Cir., Santa Rosa, Calif. 95401; Kenneth Tarlow, 94 Birch Ave., Corte Madera, Calif. 94925

[21] Appl. No.: 538,210

[22] Filed: Oct. 3, 1995

[51] Int. Cl.⁶ .................................................... B60R 13/04
[52] U.S. Cl. ........................... 428/31; 40/591; 280/727
[58] Field of Search ................. 428/31, 99; D12/197; 40/591; 280/727

[56] References Cited

U.S. PATENT DOCUMENTS

| | | | |
|---|---|---|---|
| 1,435,106 | 11/1922 | Comiskey | 428/31 X |
| 1,940,490 | 12/1933 | Frazier | 428/31 X |
| 3,241,857 | 3/1966 | Goetz | 428/31 X |
| 3,497,980 | 3/1970 | Brown et al. | 40/591 |
| 3,526,050 | 9/1970 | Weller | 428/31 X |
| 3,712,263 | 1/1973 | Faragosa | 428/31 X |
| 4,061,352 | 12/1977 | Bagne | 428/31 X |
| 4,526,820 | 7/1985 | Haas | 428/31 |
| 4,972,795 | 11/1990 | Mace | 428/31 X |

*Primary Examiner*—Henry F. Epstein

[57] ABSTRACT

A vehicle antenna accessory includes a main body for fitting on top of an antenna. A display panel with graphics arranged thereon is pivotally attached to the main body. A wing is attached orthogonally to the display panel. When the vehicle is parked, the display panel provides an easily visible identification for the owner looking for his or her vehicle among many other cars. When the vehicle is in forward motion, wind pushing against the wing causes the display panel to "fly" to a horizontal position to provide an eye-catching effect.

6 Claims, 4 Drawing Sheets

ANTENNA ACCESSORY FOR VEHICLE IDENTIFICATION

BACKGROUND OF THE INVENTION

1. Field Of The Invention

This invention relates generally to motor vehicle accessories, specifically to a vehicle accessory used for identifying a selected vehicle.

2. Prior Art

It is common practice for motorists to park their vehicles in large parking facilities. Motorists do this many times at shopping malls, entertainment event facilities, airports, and on city streets. It is important that motorists remember the location of their vehicles. However, they are often preoccupied with remembering information relating to the tasks at hand, so they do not pay attention to where their vehicles are parked. As a result, they have trouble finding their vehicles again.

OBJECTS OF THE INVENTION

Accordingly the objects of the present invention are to provide an antenna accessory for vehicle identification that is practical, that is inexpensive to manufacture, that is easy and safe for motorists to use, and that has minimal vehicle damage potential. Additional objects of the invention are to provide an antenna accessory that is durable, lightweight, and aerodynamic, so that it does not cause undue deflection of the antenna. Another object of the invention is to provide an antenna accessory that makes a fashion statement about the owner of the vehicle. Other objects of the invention are to provide an antenna accessory that fits on the tip of a car antenna, that adapts to different antennas tip sizes, that is usable on car antennas of different placement and orientation, such as a slanted antenna, a rear-mounted antenna, a front-mounted antenna, or a roof-mounted antenna. Further objects of the present invention will become apparent from a consideration of the drawings and ensuing description.

SUMMARY OF THE INVENTION

An antenna accessory for vehicle identification includes a main body attached to the tip of an automobile antenna. A display panel with a graphics panel inserted therein is hingeably attached to the main body. A wing is attached orthogonally to the display panel to cause it to swing upward when the automobile is in forward motion.

DRAWING REFERENCE NUMERALS

2. Automobile 4. Main Body
6. Antenna Accessory 8. Antenna
9. Antenna Tip 10. Display Panel
12. Wing 14. Pin
15. Arm 24. Foam Pad
25. Wind 26. Retaining Cover
28. Screws 30. Recess
32. Clear Cover Panel 34. Gasket
36. Graphics Panel 38. Notch
39. Main Panel 40. Raised Frame Portion
41. Central Recessed Portion 55. Directional Arrow

DESCRIPTION—FIG. 1

Figure 1:
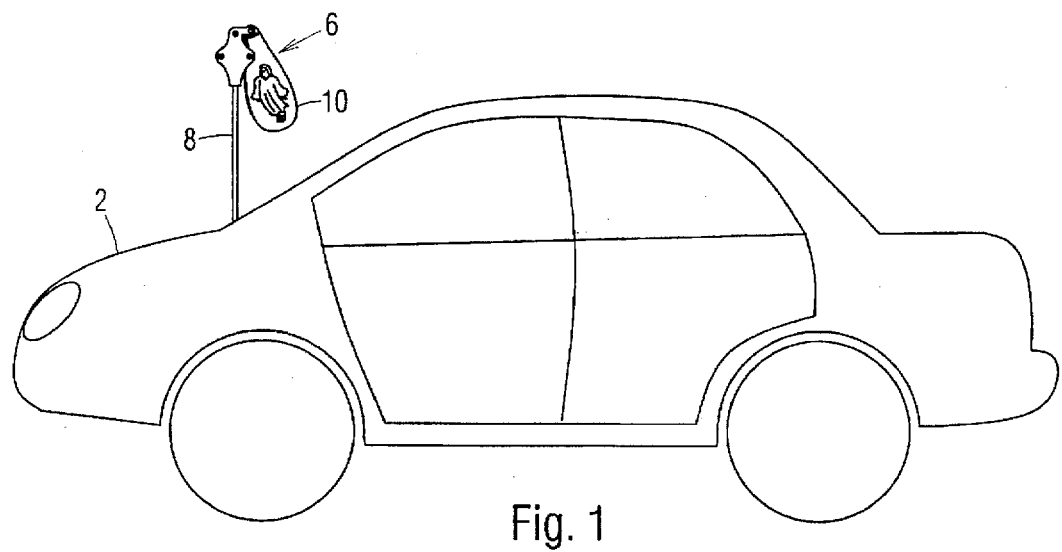
FIG. 1 is a side view of an antenna accessory of the present invention shown mounted on the tip of an antenna of a stationary automobile.

In accordance with a preferred embodiment of the invention shown in the side view of FIG. 1, an antenna accessory 6 is mounted atop an antenna 8 on a stationary automobile 2. A display panel 10 of accessory 6 is in a lowered position, and is oriented so that its plane is aligned with the longitudinal direction of automobile 2. Display panel 10 is approximately 2.5 inches wide by 4.5 inches long, so that the graphics thereon is visible at least one hundred feet away.

Figure 2:
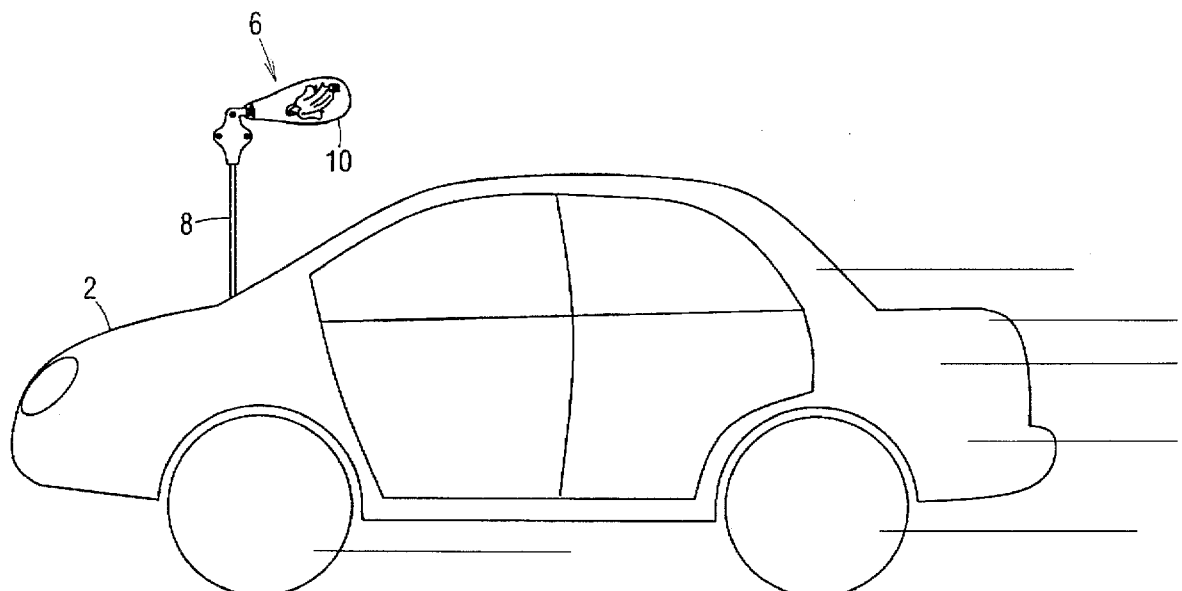
FIG. 2 is a side view of the antenna accessory when the automobile is in motion.

FIG. 2 shows automobile 2 in forward motion, which causes display panel 10 to "fly" in a horizontal position.

Figure 3:
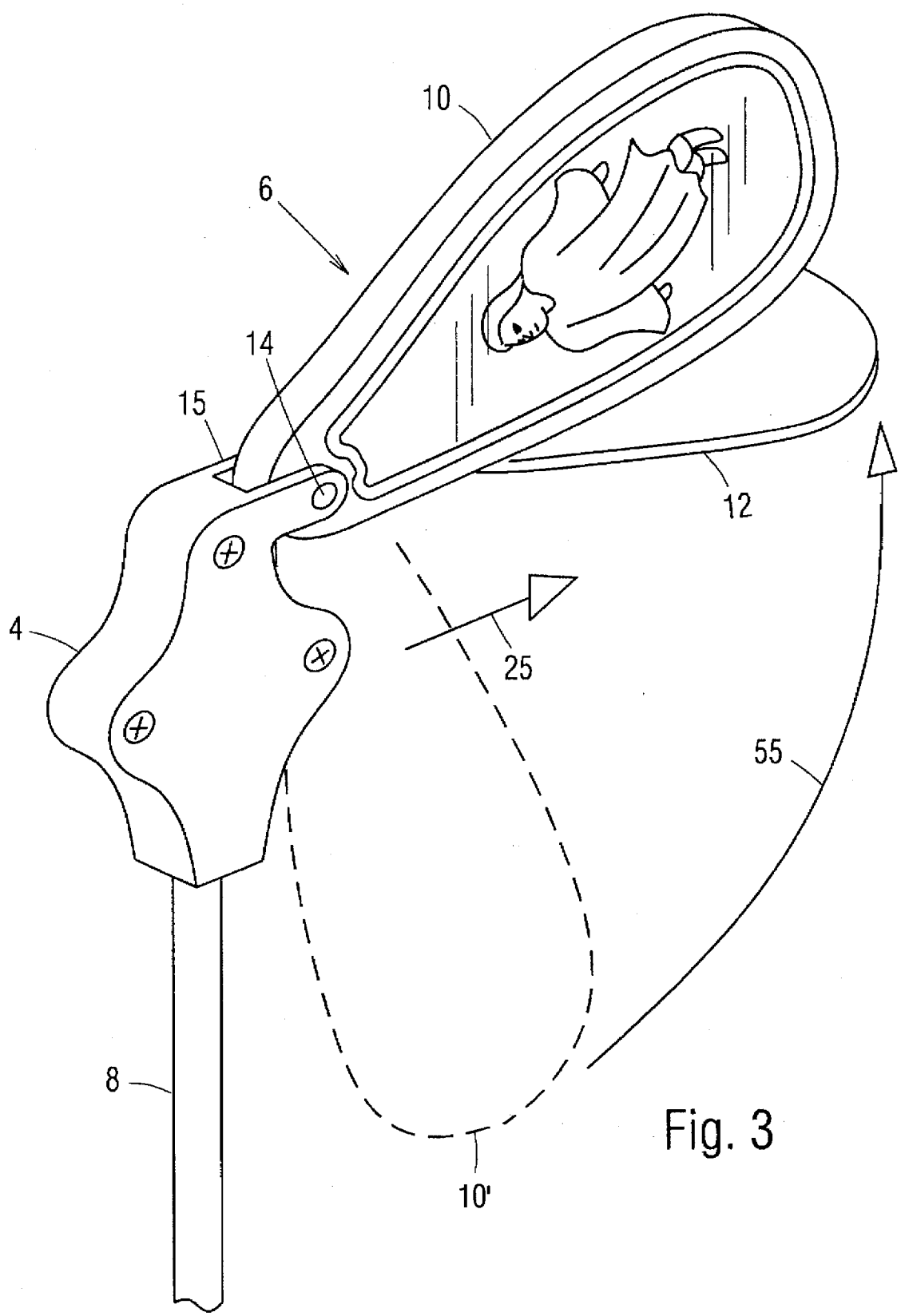
FIG. 3 is a side perspective view of the antenna accessory.

FIG. 3 is a close-up view of antenna accessory 6. It includes a main body 4 with a horizontal arm 15 at a top end thereof. Display panel 10 is rotatable about a pin 14 at the end of arm 15. A wing 12 is attached generally orthogonally to the lower edge of display panel 10. When the automobile is in forward motion, wind 25 pushes against wing 12, it causes display panel 10 to swing up to a horizontal position from a lowered position 10', as indicated by arrow 55.

Figure 4:
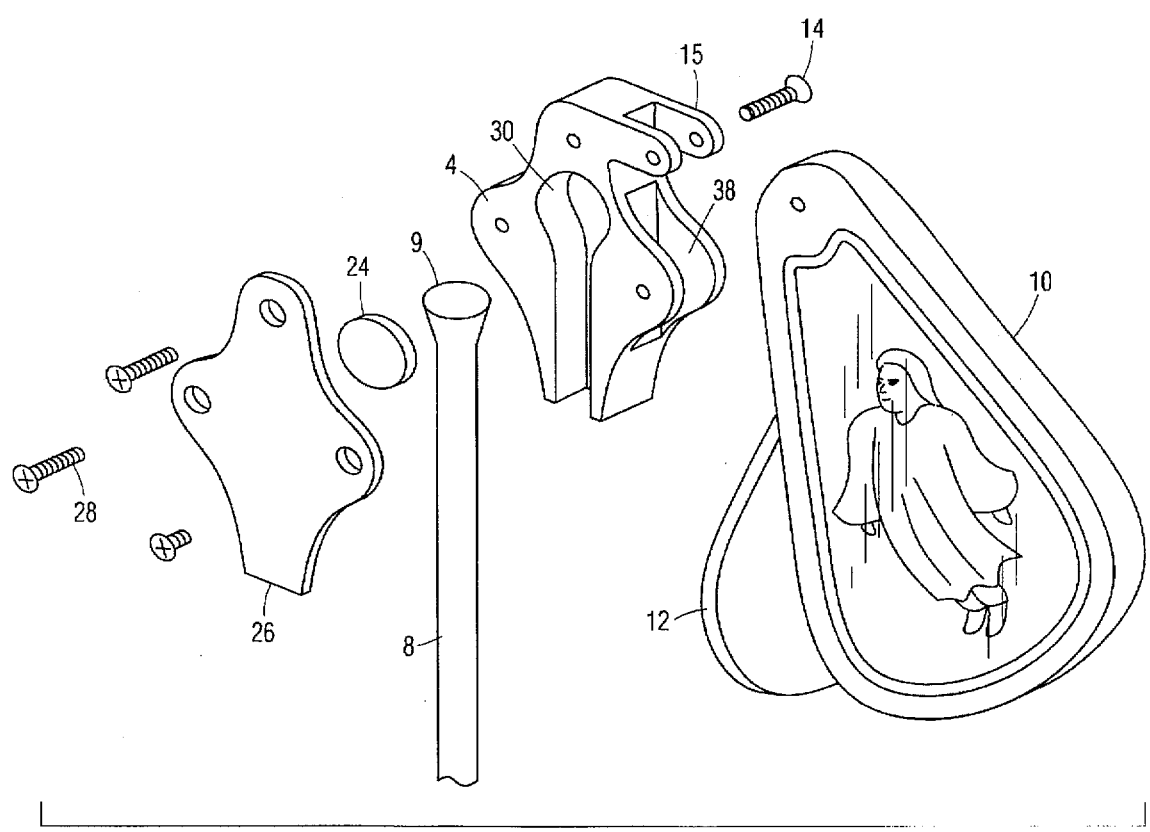
FIG. 4 is an exploded view of the antenna accessory.

FIG. 4 is an exploded view of the antenna accessory. Main body 4 includes a recess 30 into which a typical antenna tip 9 fits. A retaining cover 26, which is attached to main body 4 by screws 28, seals a foam pad 24 against antenna tip 9 for a snug fit. Display panel 10 is pivotally attached to arm 15 by pin 14. A vertical notch 38 on the trailing edge of main body 4 receives the forward edge of display panel 10 to enable it to rest in a vertical position.

Figure 5:
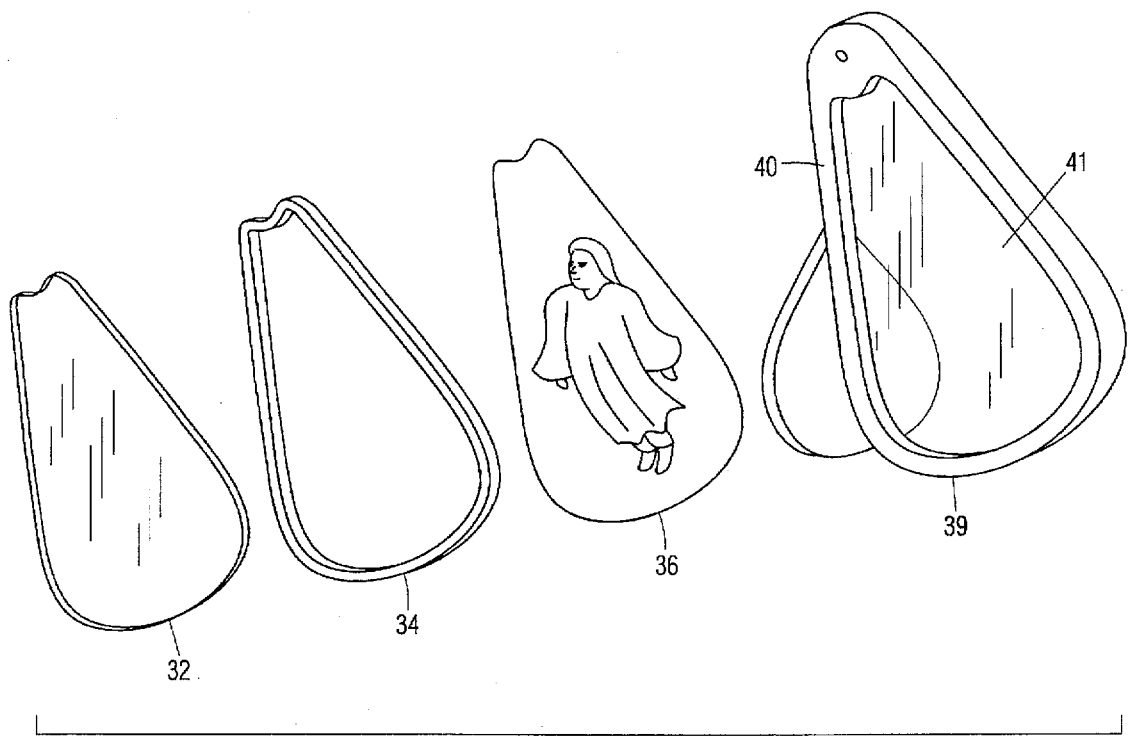
FIG. 5 is an exploded view of a display panel of the antenna accessory.

FIG. 5 is an exploded view of the display panel. A main panel 39 is made of clear rigid plastic, and has a raised frame portion 40 and a central recessed portion 41. A printed graphics panel 36 is made of thin plastic or paper, and is printed on both sides. Recessed portion 41 is sized to receive printed graphic panel 36. A resilient water-proofing gasket 34 is positioned within the inside perimeter of recessed portion 41. Clear plastic cover panel 32 press-fits into the inside perimeter of gasket 34, thereby encapsulating graphics panel 36 into a water-resistant enclosure. Graphics panel 36 may be printed with any graphics desired, for example, football team logos, angels, etc.

Although the above descriptions are specific, they should not be considered as limitations on the scope of the invention, but only as examples of the embodiments. Many substitutes and variations are possible within the teachings of the invention. Therefore, the scope of the invention should be determined by the appended claims and their legal equivalents, not by the examples given.

We claim:

1. An antenna accessory, comprising:
    main body adapted to be attached to a tip of a vehicle antenna; and
    display panel having a top end hingeably attached to said main body, said display panel being rotatable about a horizontal axis from a lowered generally vertical position to a raised generally horizontal position for attracting attention.

2. The antenna accessory of claim 1, wherein said display panel comprises a transparent main panel having a raised frame portion surrounding a central recessed portion, a gasket arranged against an inside edge of said raised frame portion, said gasket having a central opening, a transparent cover panel positioned snugly within said central opening of said gasket, and a graphics panel arranged between said cover panel and said central recessed portion of said display panel, said graphics panel having graphics printed thereon.

3. An antenna accessory, comprising:

main body adapted to be attached to a tip of an antenna on a vehicle;

flat display panel having a top end hingeably attached to said main body, a plane of said display panel being adapted to be aligned with a longitudinal direction of said vehicle, said display panel being rotatable about a horizontal axis from a lowered generally vertical position to a raised generally horizontal position; and flat wing attached orthogonally to said display panel, said wing being positioned so that when said flat display panel is in said lowered position, a plane of said wing is adapted to be aligned with a transverse direction of said vehicle, and when said vehicle is in forward motion, said wing is adapted to be lifted by an oncoming wind, so that said display panel is lifted to said horizontal position for attracting attention.

4. The antenna accessory of claim 3, wherein said display panel comprises a transparent main panel having a raised frame portion surrounding a central recessed portion, a gasket arranged against an inside edge of said raised frame portion, said gasket having a central opening, a transparent cover panel positioned snugly within said central opening of said gasket, and a graphics panel arranged between said cover panel and said central recessed portion of said display panel, said graphics panel having graphics printed thereon.

5. An antenna accessory, comprising:

a main body having an elongated vertical cavity adapted to receive a tip portion of an antenna on a vehicle;

a generally horizontal arm extending from said main body;

a flat display panel having a top end hingeably attached to a distal end of said arm, a plane of said display panel being adapted to be aligned with a longitudinal direction of said vehicle, said display panel being rotatable about a horizontal axis from a lowered generally vertical position to a raised generally horizontal position; and a flat wing attached orthogonally to said display panel, said wing being positioned so that when said flat display panel is in said lowered position, a plane of said wing is adapted to be aligned with a transverse direction of said vehicle, and when said vehicle is in forward motion, said wing is adapted to be lifted by an oncoming wind, so that said display panel is lifted to said horizontal position for attracting attention.

6. The antenna accessory of claim 5, wherein said display panel comprises a transparent main panel having a raised frame portion surrounding a central recessed portion, a gasket arranged against an inside edge of said raised frame portion, said gasket having a central opening, a transparent cover panel positioned snugly within said central opening of said gasket, and a graphics panel arranged between said cover panel and said central recessed portion of said display panel, said graphics panel having graphics printed thereon.

* * * * *